United States Patent
Naffziger

(10) Patent No.: US 8,495,395 B2
(45) Date of Patent: Jul. 23, 2013

(54) MECHANISM FOR CONTROLLING POWER CONSUMPTION IN A PROCESSING NODE

(75) Inventor: Samuel D. Naffziger, Fort Collins, CO (US)

(73) Assignee: Advanced Micro Devices, Sunnyvale, CA (US)

( * ) Notice: Subject to any disclaimer, the term of this patent is extended or adjusted under 35 U.S.C. 154(b) by 493 days.

(21) Appl. No.: 12/881,307

(22) Filed: Sep. 14, 2010

(65) Prior Publication Data

US 2012/0066535 A1  Mar. 15, 2012

(51) Int. Cl.
*G06F 1/00* (2006.01)

(52) U.S. Cl.
USPC ........... 713/300; 713/320; 713/322; 713/330; 323/907

(58) Field of Classification Search
USPC .................. 713/300, 320, 322, 330; 323/907
See application file for complete search history.

(56) References Cited

U.S. PATENT DOCUMENTS

| | | | |
|---|---|---|---|
| 7,392,414 B2 | 6/2008 | Bailey | |
| 8,037,893 B2* | 10/2011 | Aguilar et al. | 137/12 |
| 8,135,559 B2* | 3/2012 | Therien et al. | 702/130 |
| 8,356,197 B2* | 1/2013 | Allarey et al. | 713/322 |
| 2007/0005152 A1* | 1/2007 | Karr et al. | 700/22 |
| 2007/0260415 A1 | 11/2007 | Aguilar | |
| 2007/0260895 A1* | 11/2007 | Aguilar et al. | 713/300 |
| 2010/0064162 A1 | 3/2010 | Rotem et al. | |

OTHER PUBLICATIONS

Changyun Zuh, Zhenyu Gu, Li Shang, Robert P. Dick, Russ Joseph; "Three-Dimensional Chip-Multiprocessor Run-Time Thermal Management", IEEE Transactions on Computer Aided Design of Integrated Circuits and Systems,vol. 27, No. 8, Aug. 2008, pp. 1479-1492, IEEE Service Center, Piscataway, NJ, USA.

Wei Huang, Mircea R. Stan, Karthik Sankaranarayanan, Robert J. Ribando, Kevin Skadron; "Many-Core Design from a Thermal Perspective", 45th ACM/IEEE Design Automation Conference, DAC 2008, Jun. 8, 2008, pp. 746-749, IEEE, Piscataway, NJ, USA.

International Search Report issued in PCT/US2011/050275 on Dec. 7, 2011, 6 pages.

International Search Report & Written Opinion in PCT/US2011/050275 dated Feb. 23, 2012.

Changyun Zhu et al: "Three-Dimensional Chip-Multiprocessor Run-Time Thermal Management", IEEE Transactions on Computer Aided Design of Integrated Circuits and Systems, vol. 27, No. 8, Aug. 2008, pp. 1479-1492, XP011227328, IEEE Service Center, Piscataway, NJ, USA ISSN: 0278-0070, DOI:10.1109/TCAD.2008. 925793, section IV.

Ribando R J et al: "Many-core design from a thermal perspective", 45th ACM/IEEE Design Automation Conference, DAC 2008, Jun. 8, 2008, pp. 746-749, XP031280999, IEEE, Piscataway, NJ, USA, ISBN: 978-1-60558-115-6, p. 746, col. 6, line 30-line 31, p. 747, left-hand column, line 41-line 42.

* cited by examiner

*Primary Examiner* — Jaweed A Abbaszadeh
(74) *Attorney, Agent, or Firm* — Meyertons Hood Kivlin Kowert & Goetzel; Stephen J. Curran

(57) ABSTRACT

A system includes a plurality of processor cores and a power management unit. The power management unit may be configured to independently control the performance of the processor cores by selecting a respective thermal power limit for each of the plurality of processor cores dependent upon an operating state of each of the processor cores and a relative physical proximity of each processor core to each other processor core. In response to the power management unit detecting that a given processor core is operating above the respective thermal power limit, the power management unit may reduce the performance of the given processor core, and thereby reduce the power consumed by that core.

20 Claims, 4 Drawing Sheets ered by reducing performance. Conversely, if power consumption can be accurately measured while running a given application, and the power used is less than the TDP capability of the platform, performance may be increased by allowing the processor to consume the available headroom in the TDP by increasing the operating voltage, the operating frequency or both. However, since the capabilities of conventional thermal measurement mechanisms have less than acceptable granularity and repeatability in many cases, modulating activity based upon thermal and/or power limits of individual components becomes difficult.
MECHANISM FOR CONTROLLING POWER CONSUMPTION IN A PROCESSING NODE

BACKGROUND

1. Technical Field

This disclosure relates to integrated circuits and, more particularly, to power management of components on the integrated circuits during operation.

2. Description of the Related Art

Many modern processors are capable of consuming a great deal of power and in so doing may generate a significant amount of heat. If left unchecked, this heat could cause catastrophic damage to the processor. Thus, power management systems have been developed to limit the power that the processor consumes and thus the heat generated. In many power management systems, the thermal design power (TDP) for the whole chip is commonly the primary metric that is used to control power and ensure thermal limits are not exceeded. Typically, if the thermal limits are being reached, or the thermal power reaches a particular threshold, the power management system may throttle the processor by reducing performance. Conversely, if power consumption can be accurately measured while running a given application, and the power used is less than the TDP capability of the platform, performance may be increased by allowing the processor to consume the available headroom in the TDP by increasing the operating voltage, the operating frequency or both. However, since the capabilities of conventional thermal measurement mechanisms have less than acceptable granularity and repeatability in many cases, modulating activity based upon thermal and/or power limits of individual components becomes difficult.

SUMMARY OF THE EMBODIMENTS

Various embodiments of a mechanism for controlling the power consumption of a processing node are disclosed. Controlling power consumption on an integrated circuit device has been an imprecise effort in the past. However, with the advent of digital power estimation techniques granularity and precision of the estimated power on a per component basis has improved significantly. Accordingly, by monitoring the power consumed by the various processor cores and other components in a processing node, for example, and by tracking the operating states of each component, a power management unit within the processing node may be configured to control the performance and thus the power consumed by a given core or other component by dynamically manipulating the thermal design power limits for each component based upon, for example, the operating state, the external ambient temperature, and the physical proximity of each component to each other component.

In one embodiment, a system includes a plurality of processor cores and a power management unit. The power management unit may be configured to independently control the performance of the processor cores by selecting a respective thermal power limit for each of the plurality of processor cores dependent upon an operating state of each of the processor cores and a relative physical proximity of each processor core to each other processor core. In response to the power management unit detecting that a given processor core is operating above the respective thermal power limit, the power management unit may reduce the performance of the given processor core, and thereby reduce the power consumed by that core.

In one specific implementation, in response to a request to change the operating state of the processor cores to a new operating state in which additional processor cores will become active, the power management unit is configured to select a new thermal power limit having a lower value than the current thermal power limit for each of the processor cores and to change the current thermal power limit to the new thermal power limit.

In another specific implementation, in response to a request to change the operating state of the processor cores to a new operating state in which fewer processor cores will become active, the power management unit is configured to select a new thermal power limit having a higher value than the current thermal power limit for each of the processor cores and to change the current thermal power limit to the new thermal power limit subsequent to waiting a predetermined amount of time.

Figure 1:
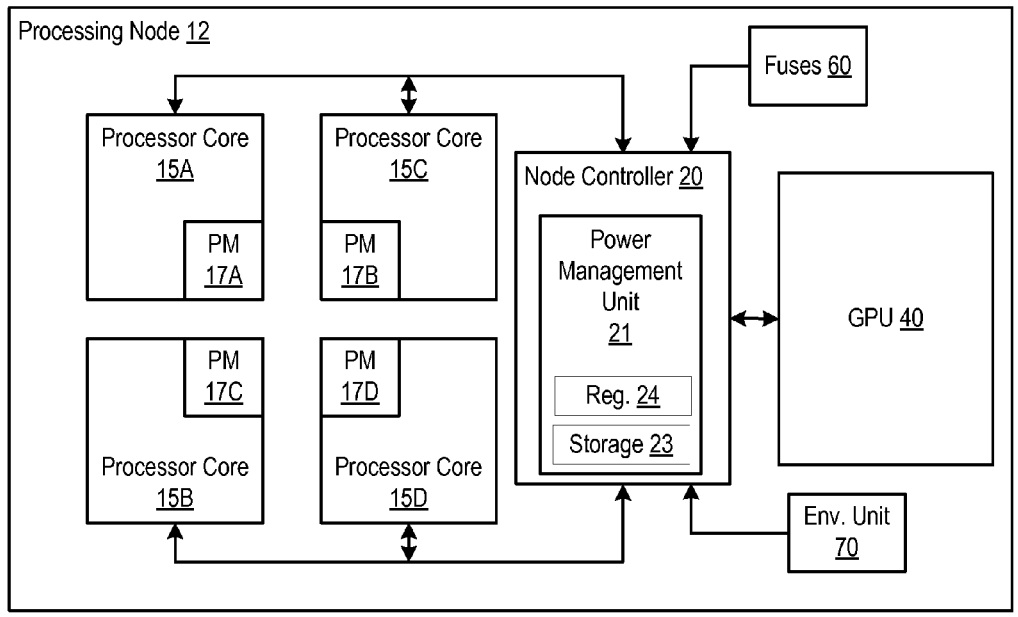
FIG. 1 is a block diagram of one embodiment of a processing node having processor cores with digital power monitors.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

Turning now to FIG. 1, a simplified block diagram of one embodiment of a processing node is shown. In the illustrated embodiment, the processing node 12 includes processor cores 15A-15B coupled to a node controller 20, which is coupled to fuses 60 and to environmental unit 70. The node controller 20 is also coupled to a graphics processor unit (GPU) 40. In one embodiment, node 12 may be a single integrated circuit chip comprising the circuitry shown therein in FIG. 1. That is, node 12 may be a chip multiprocessor (CMP). Other embodiments may implement the node 12 as two or more separate integrated circuits, as desired. Any level of integration or discrete components may be used. It is noted that components having a number and a letter as a reference designator may be referred to by the number only where appropriate. Processor cores 15A-15B may be any type of processing element and may not be identical nor even similar to each other. For example, processor core 15A or 15B may a central processing unit (CPU) core, graphics processing unit (GPU) core, digital signal processing (DSP) core, application processor (AP) core or any other core. Additionally, processor cores 15A and 15B may be any combinations thereof.

It is also noted that, a processing node such as node 12 may include any number of processor cores, in various embodiments. It is further noted that processor node 12 may include many other components that have been omitted here for simplicity. For example, in various embodiments processing node 12 may include an integral memory controller and various communication interfaces for communicating with other nodes, and I/O devices.

In one embodiment, node controller 20 may include various interconnection circuits (not shown) for interconnecting processor cores 15A and 15B to each other, to other nodes, and to a system memory (not shown). As shown, the node controller 20 includes a power management unit 21 that may be configured to control the amount of power consumed by each processor core 15 and therefore, the amount of heat generated. The power management unit 21 may be configured to control the operating frequency for each core and/or the power supply voltages for each core and/or the node using frequency identifier signals and voltage identifier signals (both not shown). In addition, as described further below, in one embodiment the power management unit 21 may be configured to control the power consumed by each core and thus the operating point based upon power estimates provided by the power monitors 17 within the processor cores 15, and based upon the operating states of each of the processor cores 15 and the GPU 40. It is noted that the power management unit 21 is shown as part of the node controller 20 in FIG. 1. In one embodiment, the power management unit 21 functionality of the node controller 20 shown in FIG. 1 may be part of the Northbridge of the processing node 12. However, it is contemplated that in other embodiments, the power management unit 21 functionality of the node controller 20 may be part of a separate embedded microcontroller unit (not shown) within the processing node 12.

Generally, a processor core (e.g., 15A-15D) may include circuitry that is designed to execute instructions defined in a given instruction set architecture. That is, the processor core circuitry may be configured to fetch, decode, execute, and store results of the instructions defined in the instruction set architecture. For example, in one embodiment, processor cores 15A-15D may implement the x86 architecture. The processor cores 15A-15D may comprise any desired configurations, including superpipelined, superscalar, or combinations thereof. Other configurations may include scalar, pipelined, non-pipelined, etc. Various embodiments may employ out of order speculative execution or in order execution.

In the illustrated embodiment, processor core 15A includes a power monitor 17A. Likewise, processor core 15B includes a power monitor 17B, and processor cores 15C and 15D, include a respective power monitor 17C and 17D. In one embodiment, each of the power monitors 17 may be configured determine the power consumed by each respective processor core 15 using, in one embodiment, digital techniques that take into account digital signal activity within each processor core 15. More particularly, the power monitors 17 may provide, to the power management unit 21, energy values that correspond to the power consumed.

In addition, in response to the energy values provided by the power monitors 17, the power management unit 21 may increase or decrease the frequency of one or more of the processor cores 15, increase or decrease the operating voltages of the cores, or otherwise control the operational state and performance of the cores in an effort to optimize performance while staying within the thermal budget of the processing node 12.

The processing node 12 may operate in one of several operating states. More particularly, the advanced configuration and power interface (ACPI) specification defines a number of operating states for computing platforms, processors, and devices. Processor power states, which are referred to as C-states (e.g., C0, C1, C2, C3, etc.), determine whether the processing node 12 is operating, or in one or more halt or sleep states. The C0 state is the operating state, while C1 is a halt state, and C3 is a sleep state. Processor performance states, which are referred to as P-states (e.g., P0, P1, P2, Pn, etc.), are a predefined set of frequency and voltage combinations at which the processing node 12 operates. Unlike other ACPI defined power states, such as C1, C2, etc., the processor is actually executing instructions in all P-states, which are sub-states of C0. P0 is defined as the maximum performance/highest power consuming state, while P1 through Pn are lower performance states and thus typically have a lower voltage/frequency combination for each state.

Typically, operating the processing node 12 at higher frequencies allows higher performance, but to achieve the higher frequency operation, the operating voltage needs to be higher as well, which makes the processing node 12 consume more power. In one embodiment, an operating system or any other high-level SW or firmware can dynamically change the performance state during operation to tradeoff between power and performance using, for example, one or more processing node operating state registers 24 within the power management unit 21.

Semiconductor material such as silicon is generally a good thermal conductor, and the temperature of each component (e.g., processor core 15A) on the integrated circuit die is influenced by the power consumption of its neighbors. Specifically, components on the die that have less than maximally active neighbors, may be allowed to consume more power thereby providing increased performance, than they would have otherwise, with a single, worst-case power limit.

Figure 2:
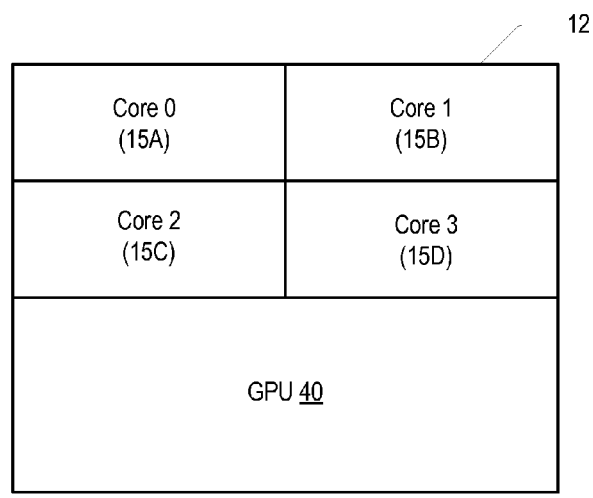
FIG. 2 is an architectural diagram depicting a component layout of one embodiment of the processing node of FIG. 1.

Referring to FIG. 2 an architectural diagram depicting an exemplary component layout of one embodiment of the processing node of FIG. 1 is shown. More particularly, the components that are cooler may act like a thermal sink to the warmer components depending on such factors as the relative proximity of each component to each other component, the cooling solution, and the like. Accordingly, as shown in FIG. 2, non-operational components that have operational components with an adjacent side may be better thermal sinks than if a component is diagonally positioned. For example, if only core 0 is operational, then core 2 and then core 1 may provide a better thermal sink than core 3 due to the arrangement of the cores. Thus, in establishing a thermal power limit or TDP limit for each component (which, as mentioned above, is used to modulate activity if limits are exceeded), information about the power consumption, the operating state of a given component's neighbors, and the thermal transfer characteristics of the various combinations of component operating states may be used. In various embodiments, the thermal characteristics may be obtained during device characterization, as well as through device modeling and simulation.

This information can be used to create any number of Power Density Multipliers (PDMs). A power density multiplier is a multiplier that may be applied to the lowest power limit for a component where that lowest power limit is determined by a traditional worst-case analysis where all components on the integrated circuit die are fully active (e.g., the C0 state), and which may increase the limit dependent upon the factors described above. More particularly, in one embodiment, the power management unit 21 may maintain one or more tables that include the operational states and either the PDMs or the new TDP core limits of the different components. In one embodiment, if there are N processor cores (where N may be any number), there may be N TDP core limit values, where each TDP core limit value corresponds to a power level for a particular combination of operating states of the processor cores 15. In another embodiment, due to its thermal mass, the operational state of the GPU 40 may be used to provide further TDP core limit values. Thus, in such an embodiment, if there are N cores, there may be 2N TDP core limit values. Exemplary PDM tables are shown in FIG. 3A and FIG. 3B.

Figure 3A:
FIG. 3A is a table depicting exemplary power density multiplier values for one embodiment of the processing node of FIG. 1.

Turning to FIG. 3A, an exemplary PDM table 330 is shown for one embodiment of the processing node of FIG. 1. In table 330, the GPU 40 is considered to be active and drawing up to its fully rated load current. Accordingly, the GPU 40 may not be considered as a thermal sink to any of the processor cores. The PDMs listed in table 330 take into account two different external ambient temperatures as denoted by the sub-table headings Ext. Ambient temp 1 and Ext. Ambient temp 2. The rows of table 330 include entries corresponding to the TDP core limit values when different numbers of cores are active (e.g., in the C0 state). More particularly, the first row corresponds to the TDP core limit values when four cores are active, row two corresponds to the TDP core limit values when three cores are active, row three corresponds to the TDP core limit values when two cores are active, and row four corresponds to the TDP core limit values when one core is active.

Referring to the columns under the Ext. Ambient temp 1 heading, when four cores are active, the PDM is 1.00 and the maximum power per core is 6.2 W. This particular TDP core limit value represents the default or "fused" value, an which may represent the worst-case operational state. As such, each core may consume up to 6.2 W before the power management unit 21 would need to take action to reduce the heat generated. However, in row three, two cores are active and thus the PDM is 1.5. This corresponds to a new TDP core limit of 9.3 W per core. As more cores enter non-active states, the PDM for each state may be a larger number, thereby increasing the TDP core limit for that operational state. A similar situation exists in the columns under the Ext. Ambient temp 2 heading, which in this example, is a lower temperature than temp 1. More particularly, since the ambient temperature is lower, the cooling solution for the processor core 12 should be able to dissipate more of the heat generated, and thus each core should be able to consume more power. As such, the PDM values (and thus the TDP core limit values) associated with external ambient temperature 2 are higher than those in the higher ambient temperature columns for each operating state.

Figure 3B:
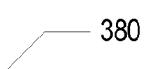
FIG. 3B is a table depicting exemplary power density multiplier values for another embodiment of the processing node of FIG. 1.

Referring to FIG. 3B, an exemplary PDM table 380 is shown for another embodiment of the processing node of FIG. 1. In some embodiments, the GPU 40 may be placed into one or more inactive or low power states, similar to the processor cores 15. Accordingly, the table 380 of FIG. 3B represents one such embodiment in which the GPU 40 may be placed in either a "power-gated" or inactive state, or in an active state. In table 380, the GPU 40 is considered to be in an inactive state, and is thus considered to consume low power and may be a thermal sink to one or more of the processor cores 15. Accordingly, for each of the core operating states (e.g., four active cores, three active cores, etc.), the PDM values and thus the TDP core limit values are higher than those shown in table 330 of FIG. 3A. For example, under the Ext. Ambient temp 1 heading, when four cores are active the PDM is 1.3 instead of 1.00. Thus, the TDP core limit for that case is 8.06 W compared to 6.2 W when the GPU 40 is active.

It is noted that the tables shown in FIGS. 3A and 3B are meant to be exemplary tables only, and for discussion purposes. In addition, although there are values given for two ambient temperatures, it is contemplated that any number of temperature groupings may be maintained in other embodiments. Likewise, in other embodiments any number of operating states may be used to provide finer or coarser granularity in the TDP core limit values, as desired. For example, instead of active and inactive, there may be operating states for any number of the performance states that may fall under the C0 state of each processor core 15. Similarly, in other embodiments, there may be more tables and/or entries for varying numbers of GPU operating states. Thus, the number of TDP core limit values may be greater or smaller than those shown in Tables 330 and 380.

Figure 4:
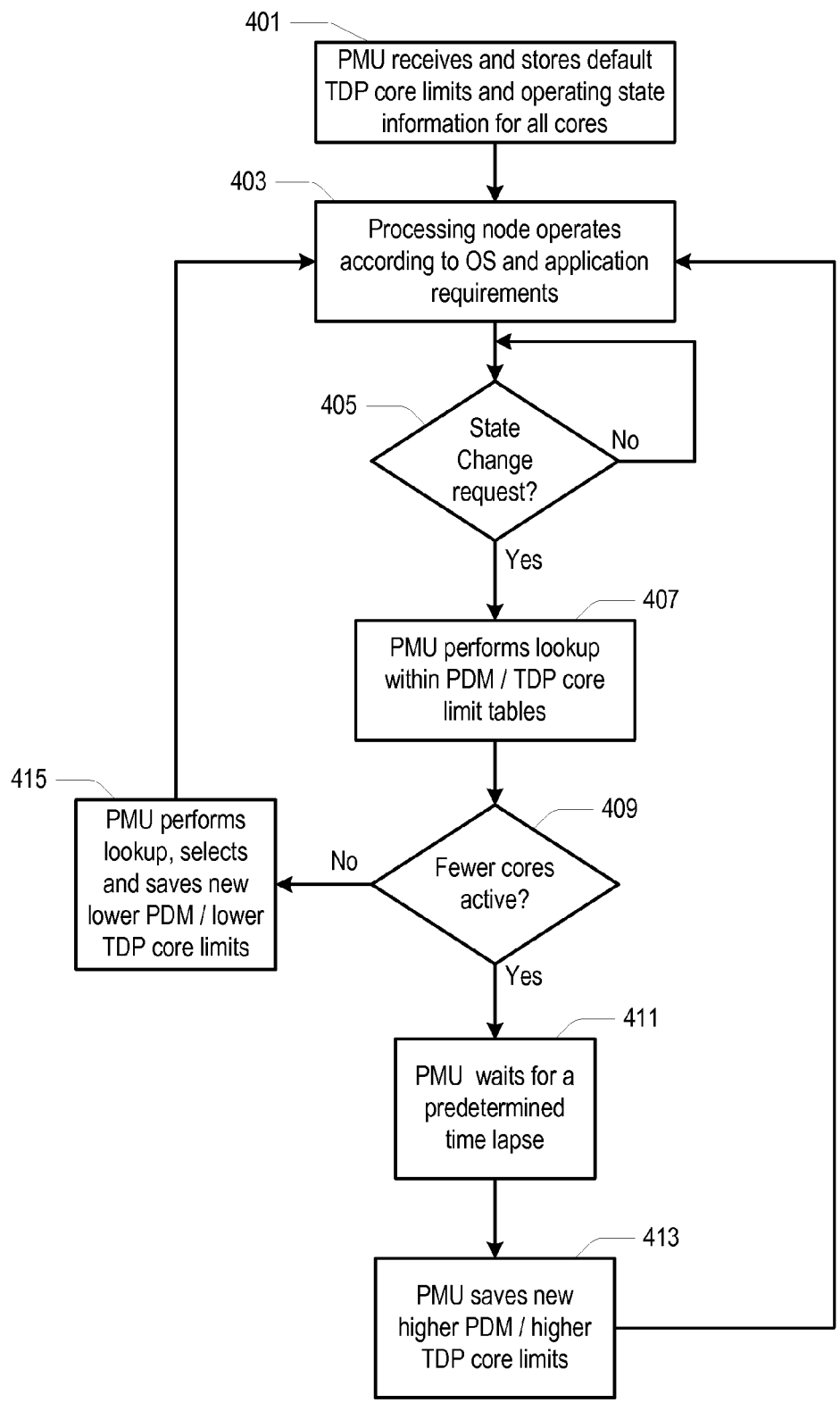
FIG. 4 is a flow diagram describing operational aspects of one embodiment of depicting an embodiment of the processing node of FIG. 1.

In FIG. 4, a flow diagram describing operational aspects of the processing node of FIG. 1 is shown. Referring collectively now to FIG. 1, FIG. 3A, FIG. 3B, and FIG. 4, and beginning in block 401 of FIG. 4, in one embodiment the power management unit 21 receives the default or fused TDP core limit values and/or the default PDM value for the processor cores 15 from the system fuses 60. The default values may be the worst-case limits, and the default operating state may be all cores active (e.g., C0). The power management unit 21 may also receive signals corresponding to the external ambient temperature from an environmental parameters unit 70. The power management unit 21 stores the TDP core limit values and the operating state for each core within registers 24. The processing node 12 may then operate according to the OS and application requirements (block 403). During operation of the processing node 12, in one embodiment, the power management unit 21 may compare the power consumed by each of the processor cores 15 to the TDP core limit value for each core. If the power management unit 21 detects that a given core is operating above the TDP core limit, the power management unit 21 may reduce the performance of that processor core 15 to reduce the heat generated by the processing node 12.

In one embodiment, the power management unit 21 may receive operating state requests from the OS. These requests may be read requests for operating state information that is maintained by the power management unit 21, or the requests may be write requests to change the operating state for one or more of the processor cores 15. In other embodiments, the request may come from sources internal to the power management unit 21 in response to thermal or power set points being exceeded. In this example, the requests are write requests to change the operating state. In response to an operating state change request (block 405), the power management unit 21 may perform a PDM or TDP core limit lookup in one or more lookup tables such as table 330 or 380, for example, within storage 23 (block 407). More particularly, as described above, the power management unit 21 may determine which entry to use in the tables based upon the operating state of each processor core 15, the operating state of the GPU 40, the external ambient temperature, and the like.

Once the power management unit 21 selects the new TDP core limit value, the power management unit 21 may determine whether more or fewer processor cores will become active as a result of the operating state change request. If the operating state change request will cause fewer processor cores 15 to become active resulting in less heat generation (block 409), then the power management unit 21 may implement the request by changing the operating state (frequency and/or voltage) of the affected processor cores 15. The power management unit 21 selects a higher PDM value and thus higher TDP core limit values for each processor core 15 and waits a predetermined amount of time to allow the processor cores 15 that became inactive to cool enough to become a thermal sink to the surrounding processor cores 15 that are still active (block 411).

The power management unit 21 stores the new higher TDP core limit values to register 24, thereby replacing the current TDP core limit value with the new TDP core limit value (block 413). Once the new TDP core limit values have been stored, the power management unit 21 may allow the new TDP core limit values to take effect. The processing node 12 may then operate according to the OS and application requirements (block 403). In one embodiment, the new TDP core limit value may be used by the power management unit 21 to modulate the performance (e.g., voltage and/or frequency) of the processor cores 15.

Referring back to block 409, if the operating state change request will cause more processor cores 15 to become active resulting in more heat generation, then the power management unit 21 may without waiting select and store a lower PDM value and thus lower TDP core limit values for each processor core 15. The power management unit 21 accesses the storage 23 to obtain the new TDP core limit values and stores the new TDP core limit values to register 24, thereby allowing the new TDP core limit values to take effect (block 415). The processing node 12 may then operate according to the OS and application requirements (block 403).

Figure 5:
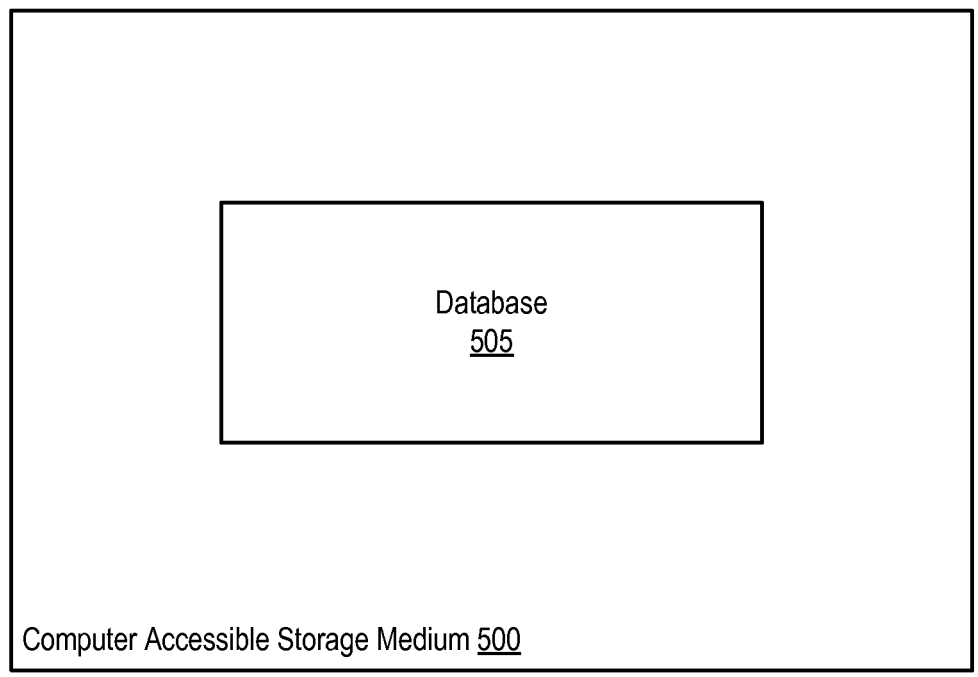
FIG. 5 is a block diagram of a computer accessible storage medium including a database representative of the processing node of FIG. 1.

Turning to FIG. 5, a block diagram of a computer accessible storage medium 500 including a database 505 representative of the processing node 12 of FIG. 1 is shown. Generally speaking, a computer accessible storage medium 500 may include any non-transitory storage media accessible by a computer during use to provide instructions and/or data to the computer. For example, a computer accessible storage medium 500 may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Generally, the database 505 of the processing node 12 carried on the computer accessible storage medium 500 may be a database or other data structure which can be read by a program and used, directly or indirectly, to fabricate the hardware comprising the processing node 12. For example, the database 505 may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the processing node 12. The netlist may then be placed and routed to produce a data set describing geometric shapes to be applied to masks. The masks may then be used in various semiconductor fabrication steps to produce a semiconductor circuit or circuits corresponding to the processing node 12. Alternatively, the database 505 on the computer accessible storage medium 400 may be the netlist (with or without the synthesis library) or the data set, as desired.

While the computer accessible storage medium 500 carries a representation of the processing node 12, other embodiments may carry a representation of any portion of the processing node 12, as desired.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a plurality of processor cores; and
   a power management unit coupled to the plurality of processor cores and configured to independently control a performance of the processor cores by selecting a respective thermal power limit for each of the plurality of processor cores dependent upon an operating state of each of the processor cores and a relative physical proximity of each processor core to each other processor core;
   wherein in response to the power management unit detecting that a given processor core is operating above the respective thermal power limit, the power management unit is configured to reduce the performance of the given processor core.

2. The system as recited in claim 1, wherein in response to a request to change the operating state of the processor cores to a new operating state in which additional processor cores will become active, the power management unit is configured to select a new thermal power limit having a lower value than the current thermal power limit for each of the plurality of processor cores and to change the current thermal power limit to the new thermal power limit.

3. The system as recited in claim 1, wherein in response to a request to change the operating state of the processor cores to a new operating state in which fewer processor cores will become active, the power management unit is configured to select a new thermal power limit having a higher value than the current thermal power limit for each of the plurality of processor cores and to change the current thermal power limit to the new thermal power limit subsequent to waiting a predetermined amount of time.

4. The system as recited in claim 2, wherein an operating system executing on a given one of the processor cores is configured to request the change to the new operating state.

5. The system as recited in claim 1, wherein the plurality of processor cores is configured to operate in a plurality of operating states, wherein a given operating state corresponds to a combination of a performance state and a power state of each of the plurality of processor cores.

6. The system as recited in claim 5, wherein the power management unit is configured to maintain a table that includes the plurality of operating states and a respective thermal power limit for each operating state.

7. The system as recited in claim 1, further comprising a graphics processing unit coupled to the power management unit and configured to operate in an active operating state and an inactive operating state, wherein in response to the graphics processing unit transitioning to an inactive state, the power management unit is configured to select a new thermal power limit having a larger value than the current thermal power limit for each of the plurality of processor cores and to change the current thermal power limit to the new thermal power limit.

8. The system as recited in claim 7, wherein in response to the graphics processing unit transitioning to an active state, the power management unit is configured to select a new thermal power limit having a smaller value than the current thermal power limit for each of the plurality of processor cores and to change the current thermal power limit to the new thermal power limit.

9. The system as recited in claim 1, wherein the power management unit is further configured to select a respective thermal power limit for each of the plurality of processor cores dependent upon an external ambient temperature, wherein in response to detecting that the external ambient temperature is below a predetermined temperature, the power management unit is configured to select a new thermal power limit having a larger value than the current thermal power limit for each of the plurality of processor cores and to change the current thermal power limit to the new thermal power limit.

10. A method comprising:
a power management unit independently controlling a performance of a plurality of processor cores by selecting a respective thermal power limit for each of the plurality of processor cores dependent upon an operating state of each of the processor cores and a relative physical proximity of each processor core to each other processor core;
wherein in response to the power management unit detecting that a given processor core is operating above the respective thermal power limit, the power management unit reducing the performance of the given processor core.

11. The method as recited in claim 10, wherein for each operating state, the power management unit selecting a respective thermal power limit.

12. The method as recited in claim 10, wherein in response to a request to change the operating state of the processor cores to a new operating state in which additional processor cores will become active, the power management unit selecting a new thermal power limit having a lower value than the current thermal power limit for each of the plurality of processor cores and changing the current thermal power limit to the new thermal power limit.

13. The method as recited in claim 10, further comprising wherein in response to a request to change the operating state of the processor cores to a new operating state in which fewer processor cores will become active, the power management unit selecting a new thermal power limit having a higher value than the current thermal power limit for each of the plurality of processor cores, and changing the current thermal power limit to the new thermal power limit subsequent to waiting a predetermined amount of time.

14. The method as recited in claim 10, further comprising operating the plurality processor cores in a plurality of operating states, wherein a given operating state corresponds to a combination of a performance state and a power state of each of the plurality of processor cores.

15. The method as recited in claim 14, further comprising the power management unit maintaining a table that includes the plurality of operating states and a respective thermal power limit for each operating state.

16. The method as recited in claim 10, further comprising a graphics processing unit operating in an active operating state and an inactive operating state, wherein in response to the graphics processing unit transitioning to an inactive state, the power management unit selecting a new thermal power limit having a larger value than the current thermal power limit for each of the plurality of processor cores and changing the current thermal power limit to the new thermal power limit.

17. The method as recited in claim 16, further comprising, in response to the graphics processing unit transitioning to an active state, the power management unit selecting a new thermal power limit having a smaller value than the current thermal power limit for each of the plurality of processor cores and changing the current thermal power limit to the new thermal power limit.

18. A computer readable medium storing a data structure which is operated upon by a program executable on a computer system, the program operating on the data structure to perform a portion of a process to fabricate an integrated circuit including circuitry described by the data structure, the circuitry described in the data structure including:
a plurality of processor cores; and
a power management unit coupled to the plurality of processor cores and configured to independently control a performance of the processor cores by selecting a respective thermal power limit for each of the plurality of processor cores dependent upon an operating state of each of the processor cores and a relative physical proximity of each processor core to each other processor core;
wherein in response to the power management unit detecting that a given processor core is operating above the respective thermal power limit, the power management unit is configured to reduce the performance of the given processor core.

19. The computer readable storage medium as recited in claim 18, wherein in response to a request to change the operating state of the processor cores to a new operating state in which additional processor cores will become active, the power management unit is configured to select a new thermal power limit having a lower value than the current thermal power limit for each of the plurality of processor cores and to change the current thermal power limit to the new thermal power limit.

20. The computer readable storage medium as recited in claim 18, wherein in response to a request to change the operating state of the processor cores to a new operating state in which fewer processor cores will become active, the power management unit is configured to select a new thermal power limit having a higher value than the current thermal power limit for each of the plurality of processor cores and to change the current thermal power limit to the new thermal power limit subsequent to waiting a predetermined amount of time.

* * * * *